United States Patent [19]

Ohmamyuda et al.

[11] Patent Number: 5,204,732
[45] Date of Patent: Apr. 20, 1993

[54] OPTICAL DISTANCE MEASURING APPARATUS

[75] Inventors: Yukio Ohmamyuda, Sagamihara; Shigeru Kimura, Yokohama; Toru Tanabe, Machida; Kazuhisa Iwasaki, Yokohama; Takao Seto, Yokohama; Hideki Kitamura, Yokohama; Kazuhiko Sugimura, Yokohama; Yasushi Senoo, Yokohama, all of Japan

[73] Assignee: Stanley Electric Co., Ltd., Tokyo, Japan

[21] Appl. No.: 846,811

[22] Filed: Mar. 6, 1992

[51] Int. Cl.$^5$ .................................. G01C 3/08
[52] U.S. Cl. .................................. 356/4
[58] Field of Search .................. 356/5, 4, 4.5

[56] References Cited

U.S. PATENT DOCUMENTS 4,274,736 6/1981 Balmer.
4,403,857 9/1983 Holscher.
4,942,561 7/1990 Ohishi et al..

FOREIGN PATENT DOCUMENTS

0010064 9/1979 European Pat. Off..
0348900 1/1990 European Pat. Off..

Primary Examiner—Mark Hellner
Attorney, Agent, or Firm—Frishauf, Holtz, Goodman & Woodward

[57] ABSTRACT

An optical distance measuring apparatus is disclosed which is operable in accordance with a phase difference detecting process wherein a processing system including a central processing unit and a digital type mixdown circuit detects and calculates a phase difference between the electrical phase of a signal output from a light receiving portion in response to receipt of a reflected light beam and the electrical phase of a reference signal output from a reference oscillator so as to determine a distance between the apparatus and a object spaced at a distance to be measured with reference to the electrical phase of a local oscillation signal output from a local oscillator. A second circuit system of the processing system on the light receiving side includes a ladder resistance type attenuation circuit, a multiplexer, an variable gain current amplifier, a wave shape correcting circuit and a signal amplitude detecting circuit. When the signal amplitude detecting circuit detects that the signal derived from the reflected light beam has an amplitude in excess of a predetermined value, the central processing unit controls the multiplexer so as to reduce a magnitude of the amplitude. In addition, an optical distance measuring apparatus operable in accordance with a time difference detecting process is disclosed.

12 Claims, 3 Drawing Sheets

OPTICAL DISTANCE MEASURING APPARATUS

BACKGROUND OF THE INVENTION

1. Field of the Invention

The present invention relates generally to an optical distance measuring apparatus operable in accordance with a phase difference detecting process. More particularly, the present invention relates to an optical distance measuring apparatus of the aforementioned type wherein a distance between the apparatus and an object to be measured can optically be determined with a high accuracy. Further, the present invention relates to an optical distance measuring apparatus operable in accordance with a time difference detecting process.

2. DESCRIPTION OF THE PRIOR ART

To facilitate understanding of the present invention, a typical conventional optical distance measuring apparatus operable in accordance with a phase difference detecting process will briefly be described below with reference to FIG. 3.

Figure 3:
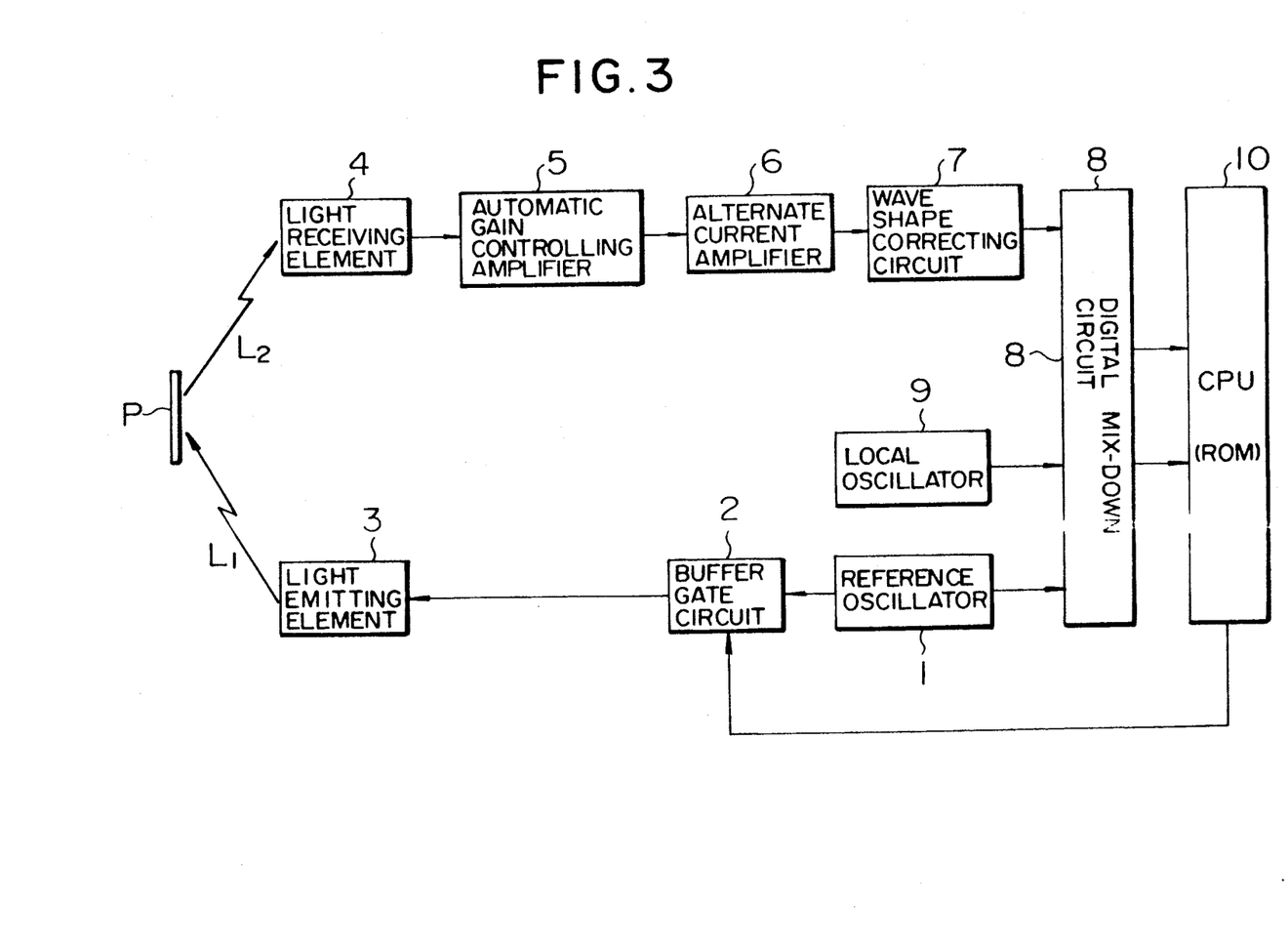
FIG. 3 is a block diagram of a conventional optical distance measuring apparatus operable in accordance with a phase difference detecting process.

FIG. 3 is a block diagram of the conventional optical distance measuring apparatus operable in accordance with a phase difference detecting process, particularly illustrates the whole structure of the apparatus. The apparatus includes a reference oscillating circuit 1 from which a reference signal is output to a light emitting element 3 via a buffer gate circuit 2 in the form of an optical signal. Subsequently, as the light emitting element 3 is activated in response to the reference signal output from the reference oscillating circuit 1, a distance measuring light beam $L_1$ is emitted toward an object P to be measured through an optical lens system (not shown).

Thereafter, the distance measuring light beam $L_1$ is reflected from the object P in the form of a reflected light beam $L_2$ which in turn is received by a light receiving element 4. After the receipt of the reflected light beam $L_2$, an output derived from the reflected light beam $L_2$ is input into an alternate current amplifier 6 via an automatic gain controlling amplifier 5, and the amplified output signal is then input into a digital type mixdown circuit 8 via a wave form correcting circuit 7.

The mix-down circuit 8 is adapted to operate to reduce the frequency of each signal based on a phase difference between the electrical phase of the reference signal output from the reference oscillating circuit 1 and the electrical phase of a local oscillation signal output from a local oscillator 9 without any variation of these electrical phases. Subsequently, an output generated from the reference oscillating circuit 1 in the form of a reference signal and an output derived from the reflected light beam $L_2$ received by the light receiving element 4 are input into a central processing unit 10 which in turn determines a distance between the apparatus and the object P by measuring the phase difference between the electrical phase of the reference signal and the electrical phase of the amplified signal derived from the reflected light beam $L_2$ transmitted from the light receiving element 4.

It should be noted that in view of the fact that an optical lens system (not shown) employable for the conventional optical measuring apparatus is well known by one expert in the art, a detailed description on the optical lens system is omitted for the purpose of simplification.

However, it has been found with respect to the conventional optical distance measuring apparatus constructed as described above that a large volume of phase correction data is required because a phase delay varies dependent on the extent of amplification in the automatic gain controlling amplifier 5, which in turn causes the phase error associated with the resultant gain to be incorrectly compensated. Thus, the distance between the apparatus and the object to be measured can not be determined with high accuracy.

The present invention has been made with the foregoing background in mind.

An object of the present invention is to provide an optical distance measuring apparatus operable in accordance with a phase difference detecting process wherein a phase error associated with a gain can correctly be compensated so as to determine a distance between the apparatus and an object to be measured.

Other object of the present invention is to provide an optical distance measuring apparatus of the aforementioned type which assures that a distance measuring operation can be performed with a high accuracy.

Another object of the present invention relates to an optical distance measuring apparatus operable in accordance with a time difference detecting process wherein a distance between the apparatus and an object to be measured can be determined based on a time difference between the time when a signal output from a light receiving portion in response to receipt of a reflected light beam is input into a central processing unit and the time when a reference signal output from a reference oscillator is input into the central processing unit.

According to one aspect of the present invention, there is provided an optical distance measuring apparatus operable in accordance with a phase difference detecting process, wherein the apparatus comprises a light emitting portion including a light emitting element and a light source from which a distance measuring light beam is emitted toward an object to be measured; an optical lens system for allowing the distance measuring light beam to be oriented to the distant object whose distance is to be measured from which the distance measuring light beam is reflected in the form of a reflected light beam; a light receiving portion including a light receiving element for receiving a reflected light beam reflected from the object whose distance is to be measured through the optical lens system; and a processing system comprising a first circuit system on the light emitting side and a second circuit system on the light receiving side and including a central processing unit and a digital type mix-down circuit for detecting and calculating a phase difference between the electrical phase of a signal derived from the reflected light beam and the electrical phase of a reference signal output from a reference oscillator electrically connected to the light emitting portion via a buffer gate circuit so as to determine a distance between the apparatus and the object to be measured with reference to the electrical phase of a local oscillation signal output from a local oscillator.

In addition, according to other aspect of the present invention, there is provided an optical distance measuring apparatus operable in accordance with a time difference detecting process, wherein the apparatus comprises a light emitting portion including a light emitting element and a light source from which a distance measuring light beam is emitted toward an distant object spaced at a distance to be measured; an optical lens system for allowing the distance measuring light beam to be oriented to the object to be measured from which the distance measuring light beam is reflected in the form of a reflected light beam; a light receiving portion including a light receiving element for receiving a reflected light beam reflected from the object whose distance is to be measured through the optical lens system; and a processing system comprising a first circuit system on the light emitting side and a second circuit system on the light receiving side and including a central processing unit and a digital type mix-down circuit for detecting and calculating a time difference between the time when a signal output from the light receiving portion in response to receipt of the reflected light beam is input into the central processing unit and the time when a reference signal output from a reference oscillator electrically connected to the light emitting portion via a buffer gate circuit is input into the central processing unit so as to determine a distance between the apparatus and the object whose distance is to be measured with reference to the time when a local oscillation signal output from a local oscillator is input into the central processing unit.

The first circuit system on the light emitting side includes a modulating circuit electrically connected to the light emitting portion and a buffer gate circuit electrically connected to the reference oscillator.

On the other hand, the second circuit system on the light receiving side includes a demodulating circuit electrically connected to the light receiving portion, a ladder resistance type attenuation circuit, a multiplexer, an alternating current amplifier, a wave shape correcting circuit electrically connected to the central processing unit via the mix-down circuit and a signal amplitude detecting circuit having an input side electrically connected to the alternating current amplifier and an output side electrically connected to the central processing unit.

The attenuation circuit includes connection points at respective ladder portions, and one of the connection points is changeably selected by the central processing unit so as to allow the selected connection point in the attenuation circuit to be electrically connected to the corresponding channel in the multiplexer, whereby the signal derived from the reflected light beam is input into the mix-down circuit via the alternating current amplifier and the wave shape correcting circuit.

When the signal amplitude detecting circuit detects that the signal derived from the reflected light beam has an amplitude in excess of a predetermined value, the central processing unit changeably controls the multiplexer so as to reduce a magnitude of the amplitude of the signal.

In addition, the central processing unit contains data on phase correction corresponding to a channel in the multiplexer through which the signal derived from the reflected light beam passes, so as to correct data regarding the measured distance with reference to data on phase correction.

Additionally, the attenuation circuit includes a plurality of channels one of which is taken as a reference channel. To assure that a distance measuring operation is performed with a high accuracy, data representing an error appearing between adjacent channels associated with the reference channel is memorized in a memory of the central processing unit so as to properly compensate an error when the latter actually appears therebetween.

Other objects, features and advantages of the present invention will readily become apparent from a reading of the following description which has been made in conjunction with the accompanying drawings.

BRIEF DESCRIPTION OF THE DRAWINGS

The present invention is illustrated in the following drawings in which.

DESCRIPTION OF THE PREFERRED EMBODIMENT

Now, the present invention will be described in detail hereinafter with reference to FIG. 1 and FIG. 2 which illustrate a preferred embodiment of the present invention, respectively. It should be noted that the same components corresponding to those of the conventional optical distance measuring apparatus described above with reference to FIG. 1 are represented by the same reference numerals, and moreover, no detailed description is made with respect to an optical lens system employable with the optical distance measuring apparatus of the present invention for the same reason described above with respect to the conventional optical distance measuring apparatus, i.e., for the purpose of simplification, because the optical lens system is well known by any expert in the art.

In general, a process of optically measuring a distance is can usually be classified into five process. A first process is a light wave interference process wherein the wavelength of a light beam is taken as a reference representing a certain length. Another process is an optical intensity modulating process wherein a light beam having a constant optical intensity is converted into a strong/weak light beam by employing certain means or the wavelength of a light beam which is determined dependent on the modulated frequency of the light beam specific to a light source adapted to output a strong/weak light beam which is taken as a reference. A third process is a phase difference detecting process wherein a phase difference between the electrical phase of a modulated signal derived from a distance measuring light beam to be emitted from a light source and the electrical phase of a demodulated signal derived from a reflected light beam received by a light receiving portion is detected and calculated to determine a distance. Another process is a time difference detecting process wherein a time difference between the time when a signal output from a light receiving portion in response to receipt of a reflected light beam is input into a central processing unit and the time when a reference signal output from a reference oscillator is input into the central processing unit. The last process is one wherein a long distance is measured by utilizing the speed of a light beam. Here, it should be noted that the phase difference detecting process briefly described above with reference to FIG. 3 and the time difference detecting process are employed to carry out the present invention. In other words, an optical distance measuring apparatus, to which the present invention is applied, is adapted to operate not only in accordance with the phase difference detecting process but also in accordance with the time difference detecting process.

Figure 1:
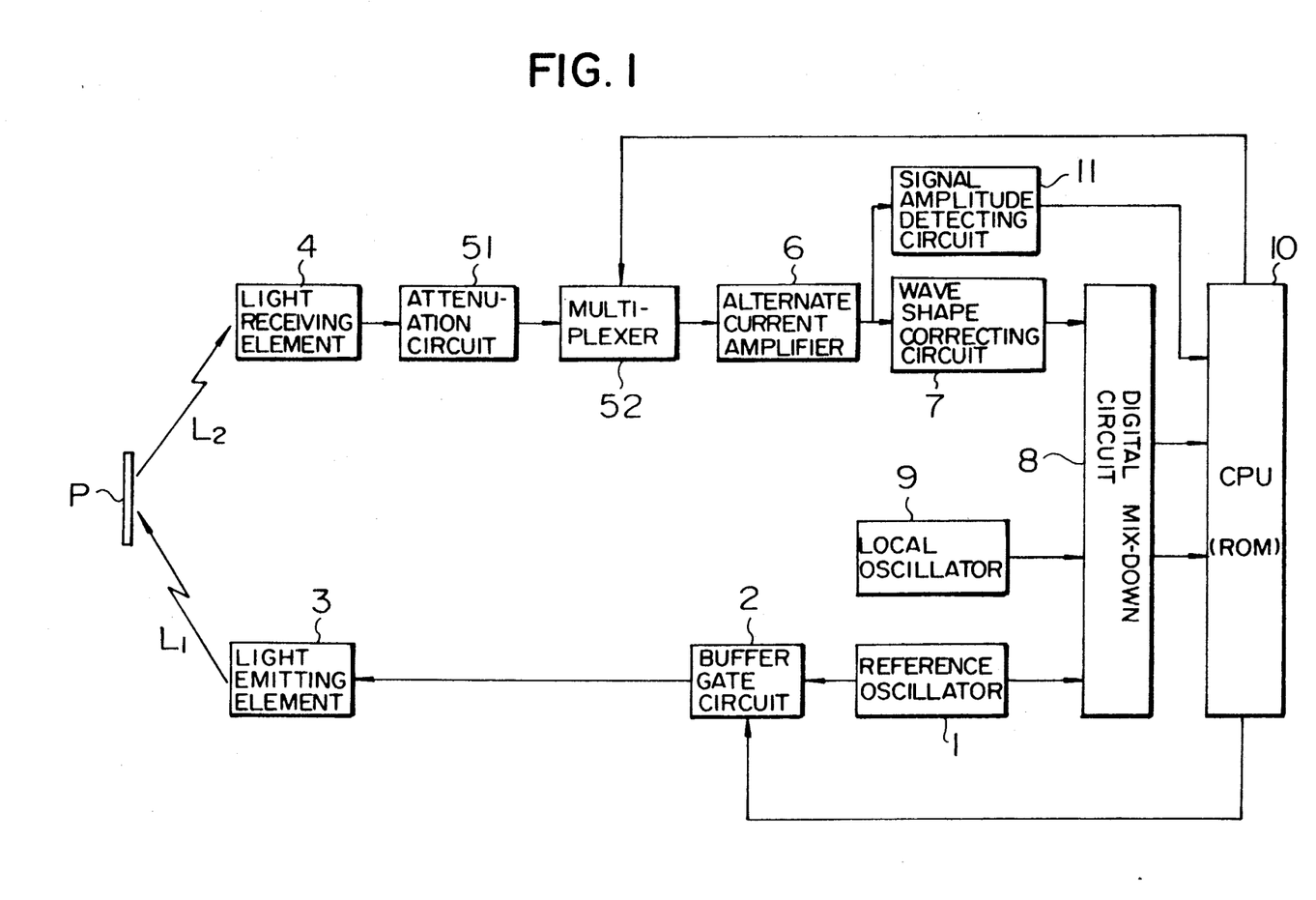
FIG. 1 is a block diagram of an optical distance measuring apparatus operable in accordance with a phase difference detecting process according to an embodiment of the present invention, an schematically illustrates the entire structure of the apparatus.
Figure 2:
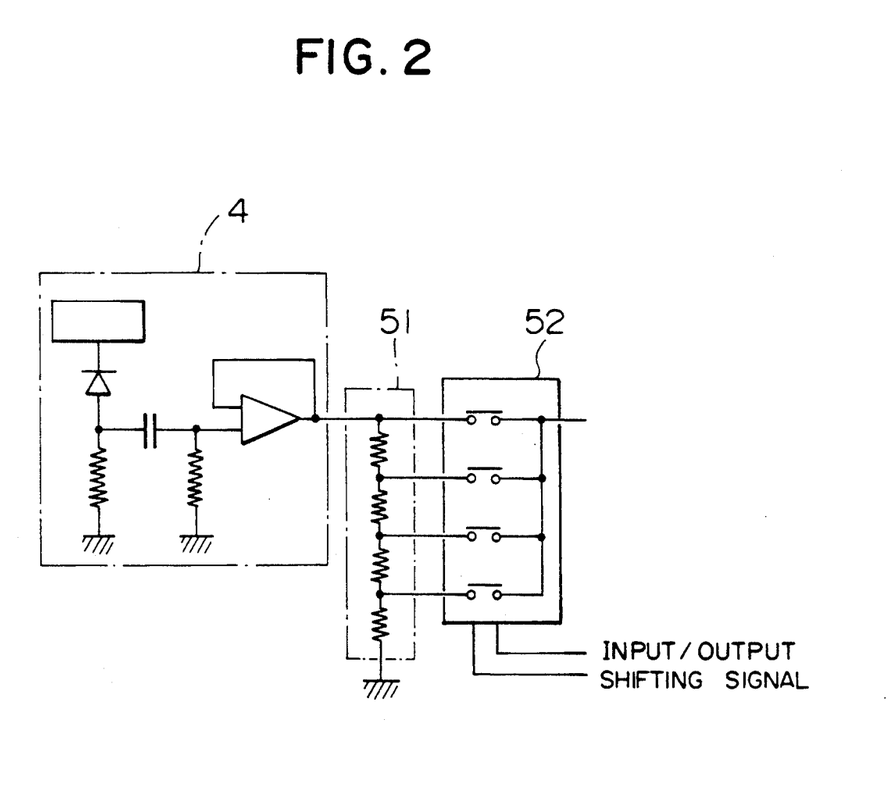
FIG. 2 is a fragmentary block diagram of the apparatus shown in FIG. 1, particularly illustrating an arrangement of a ladder resistance type attenuating circuit and a multiplexer in the apparatus.

Referring to FIG. 1 and FIG. 2, the apparatus includes a ladder resistance type attenuation circuit 51 which is electrically connected to a light receiving element 4 in an optical lens system, and an output from a ladder resistance type attenuation circuit 51 is then input into a multiplexer 52. Specifically, as shown in FIG. 2, in response to an input/output shift signal transmitted from a central processing unit (hereinafter referred to simply as CPU) 10, a connection point at a certain ladder point in the attenuation circuit 51 is selectively electrically connected to a channel in the multiplexer 52 via the corresponding channel. It should be added that a buffer circuit which is not shown in FIG. 1 may be arranged between the light receiving element 4 and the attenuation circuit 51.

The signal which has been selected by the multiplexer 52 is transmitted to an alternating current amplifier 6 in which it is amplified, and the thus amplified signal is input into a digital type mix-down circuit 8 via a wave shape correcting circuit 7 in the same manner as mentioned above with reference to FIG. 3.

The multiplexer 52 is adapted to reduce the frequency of each signal based on a phase difference between the electrical phase of a reference signal output from a reference oscillator 1 and the electrical phase of a local oscillation signal output from a local oscillator 9 without any variation of informations on these electrical phases. In other words, according to the present invention, the multiplexer 52 series in the same manner as the digital type mix-down circuit in the conventional optical distance measuring apparatus described above with reference to FIG. 3.

An output from the reference oscillator 1 in the form of a reference signal, which has been subjected to frequency conversion in the mix-down circuit 8, and an output from the light receiving element 4 generated in response to receipt of a reflected light beam $L_2$ are input via the mix-down circuits into the CPU 10 which in turn determines a distance between the apparatus and an object P to be measured with a high accuracy by measuring the phase difference between the electrical phase of the reference signal and the electrical phase of the amplified signal derived from the reflected light beam $L_2$.

In this case, e.g., when it is assumed that the reference signal output from the reference oscillator 1 has a frequency of 1.2 MHz and the local oscillation signal output from the local oscillator 9 has a frequency of 1.19904 MHz, the apparatus makes it possible to convert the signal derived from the reflected light beam $L_2$ into a signal having a frequency of 960 Hz while exhibiting the same electrical phase as that of the reference signal derived from the reference oscillator 1.

With this construction, it is actually true that the apparatus of the present invention can determine a distance between the apparatus and the object P to be measured. However, since an optical quantity of the reflected light beam $L_2$ received by the light receiving element 4 varies dependent on the distance between the apparatus and the object P, a malfunction could arise that an amplitude of the signal derived from the reflected light beam $L_2$ varies when the signal is amplified in the alternating current amplifier 6, resulting in the amplitude of the signal derived from the reflected light beam $L_2$ being increased remarkably.

In addition, once the amplitude of the signal derived from the reflected light beam $L_2$ having an electrical intensity that has been amplified in the alternating current amplifier 6 is increased, there arises another possible malfunction that a transmission time varies due to many other factors such as distortion of a wave form, a distortion gain rate of the alternating current amplifier 6 or the like, resulting in the present electrical phase of the signal derived from the reflected light beam $L_2$ failing to be measured with a high accuracy.

In view of the aforementioned possible malfunctions, according to the present invention, the apparatus is provided with a signal amplitude detecting circuit 11 for detecting an amplitude of the signal amplified in the alternating current amplifier 6. When the signal amplitude detecting circuit 11 detects that the signal derived from the reflected light beam $L_2$ has an amplitude in excess of a predetermined value, the CPU 10 controls the multiplexer 52 such that the channel in the multiplexer 52 is changed to another one so as to reduce a magnitude of the present amplitude.

However, when a channel for allowing the signal of the reflected light beam $L_2$ having a high frequency to be transmitted therethrough is changed to another one or if components through which the signal passes are changed, there arises another possible malfunction that a transmission delay time varies, resulting in the distance between the apparatus and the object to be measured failing to be determined with a high accuracy.

To obviate the foregoing malfunction, according to the present invention, in view of the fact that when the present channel in the multiplexer 52 is changed to another one, a pattern on a printed circuit board is changed to another one or if components are changed for allowing the signal derived from the reflected light beam $L_2$ to pass therethrough then a delay time appearing between adjacent channels in the attenuation circuit 51 can assume a certain constant value when the signal of the reflected light beam $L_2$ is restrictively defined to have a specific amplitude as mentioned above. The CPU 10 can contains data on phase correction corresponding to the channel in the multiplexer 52 through which the signal of the reflected light beam $L_2$ passes so that the CPU 10 corrects data on the measured distance with reference to the data on phase correction.

In addition, according to the present invention, one of plural channels in the attenuation circuit 51 is taken as a reference channel, and moreover, only an error appearing between adjacent channels associated with the reference channel is memorized in a ROM of the CPU 10 so as to compensate an error when the latter actually appears between the foregoing adjacent channels.

Specifically, since an actual delay time specific to the adjacent channels appears when the reference signal output from the reference oscillator 1 is initially input into the CPU 10 and memorized in the ROM of the CPU 10, the apparatus makes it possible to obtain an exact value representing the distance between the apparatus and the object by properly adjusting the initially memorized value even when the present channel in the multiplexer 52 is changed to another one In contrast with the conventional apparatus, the apparatus of the present invention makes it possible to increase the range where the distance between the apparatus and the object can be measured with the apparatus of the present invention, by employing electrical means even though the present gain is changed to another one.

It should be noted that in addition to the aforementioned circuits, a processing system for the apparatus of the present invention includes a modulating circuit, a demodulating circuit and other circuit each of which is an essential component for the apparatus but since these circuits are well known by any expert in the art, illustration and description on these circuits are neglected for the purpose of simplification. As described above, according to the present invention, the apparatus is constructed such that an output from the light receiving element 4 in response to receipt of the reflected light beam $L_2$ is input into the attenuation circuit 51, one at of connection points on a respective ladder in the attenuation circuit 51 and is selectively changeably connected to the corresponding channel in the multiplexer 52. Moreover the signal selected by the multiplexer 52 is amplified in the alternating current amplifier 6 so as to allow the amplified signal to be input into the mix-down circuit 8 via the wave shape correcting signal 7. With such a construction, the distance between the apparatus and the object to be measured can be determined with a high accuracy with the aid of the CPU 10 based on a phase difference between the electrical phase of the signal derived from the reflected light beam $L_2$ and the electrical phase of the reference signal output from the reference oscillator 1 in accordance with a phase difference detecting process. Alternatively, the distance between the apparatus and the object to be measured may be determined with the aid of the CPU 10 based on a time difference between the time when the signal derived from the reflected light beam $L_2$ is input into the mix-down circuit 8 and the time when the reference signal output from the reference oscillator 1 is input into the mix-down circuit 8 in accordance with the time difference detecting process.

In addition, the CPU 10 contains data on phase correction corresponding to the channel in the multiplexer 52 for allowing the signal derived from the reflected light beam $L_2$ to pass therethrough, and moreover, the CPU 10 corrects data on the measured distance with reference to the data on phase correction. Thus, the apparatus of the present invention can properly compensate a phase error corresponding to a certain gain.

Additionally, one of plural channels in the attenuation circuit 51 is taken as a reference channel and only an error appearing between adjacent channels associated with a reference channel is memorized in the ROM of the CPU 10. Thus, a value representing the distance between the apparatus and the object to be measured can be determined with a high accuracy.

While the present invention has been described above with respect to a single preferred embodiment thereof, it should of course be understood that the present invention should not be limited to this embodiment but various changes or modifications may be made without departure from the scope of the present invention as defined by the appended claims.

What is claimed is:

1. A phase difference optical distance measuring apparatus comprising:
   a light emitting portion including a light emitting means having a light source for emitting a distance measuring light beam toward an object spaced at a distance that is to be measure from said light emitting portion;
   an optical lens system for directing said distance measuring light beam toward said object, said distance measuring light beam is being reflected from said object in the form of a reflected light beam;
   a light receiving portion including a light receiving element for receiving the reflected light beam reflected from said object through said optical lens system; and
   a processing system comprising:
      a first circuit in the light emitting portion; and
      a second circuit in the light receiving portion; and
      a central processing unit and a digital mix-down circuit for detecting and calculating a phase difference between an electrical phase of a signal derived from said reflected light beam and an electrical phase of a reference signal output from a reference oscillator that is coupled to said light emitting portion through a buffer gate circuit, said central processing unit and said mix-down circuit determining a distance between said light emitting portion and said object spaced at a distance with reference to an electrical phase of a local oscillation signal output from a local oscillator; and said second circuit including:
         a demodulating circuit electrically connected to said light receiving portion;
         a ladder resistance attenuation circuit;
         a multiplexer;
         an alternating current amplifier;
         a wave shape correcting circuit electrically connected to said central processing unit through said digital mix-down circuit; and
         a signal amplitude detecting circuit having an input side which is electrically connected to said alternating current amplifier, said signal amplitude detecting circuit having an output which is coupled to said central processing unit.

2. The apparatus as claimed in claim 1, wherein said first circuit includes a modulating circuit electrically connected to said light emitting portion, and a buffer gate circuit electrically connected to said reference oscillator.

3. The apparatus as claimed in claim 1, wherein a selected one of a plurality of connection points of a respective ladder in said attenuation circuit is changeably selected by said central processing unit so as to allow said selected connection point in said attenuation circuit to be electrically connected to a corresponding channel in said multiplexer, whereby said signal derived from said reflected light beam is input into said mix-down circuit through said alternating current amplifier and said wave shape correcting circuit.

4. The apparatus as claimed in claim 1, wherein when said signal amplitude detecting circuit detects that said signal derived from said reflected light beam has an amplitude in excess of a predetermined value, said central processing unit controls said multiplexer to reduce a magnitude of said amplitude.

5. The apparatus as claimed in claim 1, wherein said central processing unit includes a memory for storing a plurality of phase correction data corresponding to a channel in said multiplexer through which channel, said signal derived from said reflected light beam is transmitted, for correcting a measured distance with said plurality of phase correction data.

6. The apparatus as claimed in claim 1, wherein:

said attenuation circuit includes a plurality of channels, one of said channels being selected as a reference channel; and data representing an error appearing between another of said channels adjacent said reference channel and said reference channel is stored in a memory of said central processing unit for compensating for an error when the error actually appears between the reference channel and said another adjacent channel.

7. A time difference optical distance measuring apparatus, comprising:

a light emitting portion including a light emitting element having alight source for emitting a distance measuring light beam toward an object spaced at a distance that is to be measure from said light emitting portion;

an optical lens system for directing said distance measuring light beam toward said object, said distance measuring light beam being reflected from said object in the form of a reflected light beam;

a light receiving portion including a light receiving element for receiving the reflected light beam reflected from said object through said optical lens system; and a processing system comprising:
  a first circuit in the light emitting portion;
  a second circuit in the light receiving portion; and
  a central processing unit and a digital mix-down circuit for detecting and calculating a time difference between a time when a signal output from said light receiving portion in response to receipt of said reflected light beam is input into said central processing unit, and a time when a reference signal output from a reference oscillator that is coupled to said light emitting portion through a buffer gate circuit is input into said central processing unit, said central processing unit and said mix-down circuit determining a distance between said apparatus and said object with reference to a time when a local oscillation signal output from a local oscillator is input into said central processing unit; and said second circuit including:
  a demodulating circuit electrically connected to said light receiving portion;
  a ladder resistance attenuation circuit;
  a multiplexer;
  an alternating current amplifier;
  a wave shape correcting circuit electrically connected to said central processing unit through said digital mix-down circuit; and
  a signal amplitude detecting circuit having an input which is electrically connected to said alternating current amplifier and having an output which is electrically connected to said central processing unit.

8. The apparatus as claimed in claim 7, wherein said first circuit includes a modulating circuit electrically connected to said light emitting portion, and a buffer gate circuit electrically connected to said reference oscillator.

9. The apparatus as claimed in claim 7, wherein a selected on of a plurality of connection of a respective ladder in said ladder resistance attenuation circuit is changeably selected by said central processing unit so as to allow said selected connection point in said attenuation circuit to be electrically connected to a corresponding channel in said multiplexer, whereby said signal derived from said reflected light beam is input into said mix-down circuit via said alternating current amplifier and said wave shape correcting circuit.

10. The apparatus as claimed in claim 7, wherein, when said signal amplitude detecting circuit detects that said signal derived from said reflected light beam has an amplitude in excess of a predetermined value, said central processing unit controls said multiplexer so as to reduce a magnitude of said amplitude.

11. The apparatus as claimed in claim 7, wherein said central processing unit includes a memory for storing phase correction data corresponding to a channel in said multiplexer through which channel said signal derived from said reflected light beam is transmitted, for correcting a measured distance with said phase correction data.

12. The apparatus as claimed in claim 7, wherein:
said attenuation circuit includes a plurality of channels, one of said attenuation channels being a reference channel; and data representing an error appearing between another one of said channels adjacent said reference channel is stored in a memory of said central processing unit for compensating for an error when the error actually appears between the reference channel and the another adjacent channel.

* * * * *

UNITED STATES PATENT AND TRADEMARK OFFICE
CERTIFICATE OF CORRECTION

PATENT NO. : 5,204,732

DATED : April 20, 1993

INVENTOR(S) : OHMAMYUDA, Yukio et al.

It is certified that error appears in the above-identified patent and that said Letters Patent is hereby corrected as shown below:

Item [30],
Title page, Insert:
  Under "Foreign Application Priority Data"
  --March 12, 1991  [JP]  Japan ......3-072598--.

Drawings, Fig 3:
  Add --Prior Art-- after "Fig. 3"

Column 4, line 38, delete "is".

Column 6, line 9, after "distortion"  insert --in--.

Column 7, line 14, "one at of" should be --at one of--.

Column 7, line 67 (claim 1), "measure" should be --measured--.

Column 8, line 3 (claim 1), delete "is".

Column 9, line 14 (claim 7), "alight" should be --a light--.

Column 9, line 16 (claim 7), "measure" should be --measured--.

UNITED STATES PATENT AND TRADEMARK OFFICE
CERTIFICATE OF CORRECTION

PATENT NO. : 5,204,732
DATED : April 20, 1993
INVENTOR(S) : Ohmanmuda, Yukio, et. al.

It is certified that error appears in the above-indentified patent and that said Letters Patent is hereby corrected as shown below:

Column 10, line 16 (claim 9), "selected on" should be --delected one--.

Signed and Sealed this

Ninth Day of August, 1994

Attest:

BRUCE LEHMAN

Attesting Officer        Commissioner of Patents and Trademarks

UNITED STATES PATENT AND TRADEMARK OFFICE
CERTIFICATE OF CORRECTION

PATENT NO. : 5,204,732

DATED : April 20, 1993

INVENTOR(S) : OHMAMYUDA, Yukio et al.

It is certified that error appears in the above-identified patent and that said Letters Patent is hereby corrected as shown below:

Item [30],
Title page, Insert:
    Under "Foreign Application Priority Data"
    --March 12, 1991 [JP] Japan ......3-072598--.

Drawings, Fig 3:
    Add --Prior Art-- after "Fig. 3"

Column 4, line 38, delete "is".

Column 6, line 9, after "distortion" insert --in--.

Column 7, line 14, "one at of" should be --at one of--.

Column 7, line 67 (claim 1), "measure" should be --measured--.

Column 8, line 3 (claim 1), delete "is".

Column 9, line 14 (claim 7), "alight" should be --a light--.

Column 9, line 16 (claim 7), "measure" should be --measured--.

UNITED STATES PATENT AND TRADEMARK OFFICE
CERTIFICATE OF CORRECTION

PATENT NO. : 5,204,732
DATED : April 20, 1993
INVENTOR(S) : Ohmamyuda Yukio, et. al.

It is certified that error appears in the above-indentified patent and that said Letters Patent is hereby corrected as shown below:

Column 10, line 16 (claim 9), "selected on", should read --selected one--.

This certificate supersedes Certificate of Correction issued August 9, 1994.

Signed and Sealed this

Twenty-fourth Day of January, 1995

Attest:

BRUCE LEHMAN

Attesting Officer

Commissioner of Patents and Trademarks